3,053,684
INORGANIC METAL OXIDES

Gerhard Bayer, Zurich, Switzerland, assignor to Owens-Illinois Glass Company, a corporation of Ohio
No Drawing. Filed Sept. 8, 1960, Ser. No. 54,602
6 Claims. (Cl. 106—292)

This invention relates to certain inorganic metal oxide compounds. In a more specific aspect, the invention relates to new inorganic metal oxide compounds which can be prepared in spinel-type crystalline form, and to methods for the preparation of such compounds.

It is an object of this invention to provide new inorganic metal oxide compounds of antimony and at least one other selected metal.

It is a further object of this invention to provide methods for the preparation of such compounds.

A still further object of the invention is to provide new spinel-type inorganic metal oxide crystalline compounds, and to provide methods for their preparation.

According to the present invention, I have now discovered new compounds of the general formula $$A_{2.33}Sb_{0.67}O_4$$

where $A_{2.33}$ is $$Zn_{(2.33-y)}Mg_y$$
$$Zn_{(2.33-y)}Ni_y$$
$$Co_{(2.33-y)}Mg_y$$

or $$Co_{(2.33-y)}Ni_y$$

where $y$ is any number in the range from 1 to 0.

Specific examples of these compounds are (1) $Zn_{2.33}Sb_{0.67}O_4$
(2) $Co_{2.33}Sb_{0.67}O_4$
(3) $Zn_{1.33}Mg_1Sb_{0.67}O_4$
(4) $Zn_{1.33}Ni_1Sb_{0.67}O_4$
(5) $Co_{1.33}Mg_1Sb_{0.67}O_4$
(6) $Co_{1.33}Ni_1Sb_{0.67}O_4$
(7) $Zn_{1.66}Mg_{0.67}Sb_{0.67}O_4$
(8) $Zn_2Ni_{0.33}Sb_{0.67}O_4$ In general, these compounds are prepared by solid-state reactions by a method which comprises mixing powders of the corresponding oxides, pressing them into cohesive shapes, and firing the intimately-mixed components for a period of time at an elevated temperature. Ten hours at 1260° C. has been found to be satisfactory. However, longer or shorter times can be employed say, from 6 to 15 hours, at temperatures from 1100 to 1350° C., although times and temperatures outside these ranges can be employed. Generally, the temperature employed is from 1200 to 1350° C. The heating step at such elevated temperature should be preceded by a preheating step at a lower temperature to avoid volatilizing the antimony oxide. Generally, preheating at 650 to 750° C. for 15 to 25 hours is satisfactory, followed by slowly raising the temperature over a period of about 15 to 20 hours, to the final value in the range from about 1100 to about 1350° C. This procedure not only avoids volatilization but also allows oxidation of the antimony to the pentavalent state. Obviously, the limits of the time and temperature ranges which can be employed to prepare a given compound can be easily determined, if desired, by routine test.

Generally, the simple oxides of the individual metals are mixed in proportions to prepare the desired compound, as called for by the formula of the particular compound desired.

As the starting material antimony oxide, $Sb_2O_3$, $Sb_2O_4$ or $Sb_2O_5$, can be used, although $Sb_2O_3$ is usually employed because of its ready availability. The firing step is conducted in an oxidizing atmosphere, such as air or oxygen or other atmosphere containing oxygen in order to obtain and maintain the antimony in the five-valent state.

The cobalt-antimony oxide compound listed in Formula 2 can also be simply prepared from the trirutile-type compound, $CoSb_2O_6$, by heating at an elevated temperature, e.g., 1300° C., to voltilize the excess antimony oxide. The pure compound of Formula 2 in spinel-type crystalline form was prepared by this method. The excess of antimony oxide volatilized. The crystalline structure was shown by X-ray patterns. Complete agreement was found between theoretical and observed lattice spacings. The lattice constant was $$a_0 = 8.54 \pm 0.005$$

angstrom units. The components was black in appearance. The heating time at 1300° C. was 10 hours.

The following further specific examples of the compounds and methods of the present invention are illustrated in the following examples. These examples are merely illustrative and are not to be taken as limiting.

Example 1

Finely-powdered zinc oxide and finely-powdered antimony trioxide were intimately admixed in the ratio of 7 mols of zinc oxide to 1 mol of antimony trioxide. The powdered mixture was pressed into a cohesive disc shape and the disc was fired in the presence of air at 700° C. for about 20 hours and slowly raised to 1260° C. over about the next 20 hours, where heating was continued for 10 hours. The resulting compound was then cooled to room temperature. The compound formed was that shown in Formula 1. X-ray patterns showed that the compound was of a spinel-type crystalline form with a lattice constant, $a_0 = 8.585 \pm 0.005$ angstrom units. This is in complete agreement with the theoretical lattice spacing. The compound was very stable and showed no decomposition after heating at 1320° C. and cooling down to room temperature. The compound had a density of $6.00 \pm 0.10$ grams/cc., determined pycnometrically. The volume magnetic susceptibility was about $-1.4 \times 10^{-6}$ c.g.s. units. The mass magnetic susceptibility was about $0.24 \times 10^{-6}$ c.g.s. units. The compound was light yellow in color.

Example 2

Finely-powdered cobaltous oxide and finely-powdered antimony trioxide were intimately admixed in the ratio of 7 mols of cobaltous oxide to 1 mol of antimony trioxide. The powdered mixture was pressed into a cohesive disc shape and the disc was fired in the presence of air at 700° C. for about 20 hours and slowly raised to 1260° C. over about the next 20 hours, where heating was continued for 10 hours. The resulting compound was then cooled to room temperature. The compound formed was that shown in Formula 2. X-ray patterns showed that the compound was of a spinel-type crystalline form with a lattice constant, $$a_0 = 8.54 \pm 0.005$$

angstrom units. This is in complete agreement with the theoretical lattice spacing. The compound was very stable and showed no decomposition after heating at 1320° C. and cooling down to room temperature. The compound had a density of $5.52 \pm 0.12$ grams/cc., determined pycnometrically. The volume magnetic susceptibility was about $344 \times 10^{-6}$ c.g.s. units. The mass magnetic susceptibility was about $62 \times 10^{-6}$ c.g.s. units. The compound was black in color.

Example 3

The compound of Formula 3 was prepared just as described in Example 1, except that 3 mols of the 7 mols of ZnO were replaced with 3 mols powdered MgO. The compound of Formula 3 was obtained as a spinel-type crystalline compound whose X-rays diffraction patterns showed a lattice constant, $a_0 = 8.56 \pm 0.01$ angstrom units. It was white in appearance.

I have also found that modified crystalline compounds of Formulas 1 and 2 can be prepared by substitution of five-valent tantalum for part of the five-valent antimony. Such compounds are of the general formulas $$Zn_{2.33}Sb_{(0.67-x)}Ta_xO_4$$

and $$Co_{2.33}Sb_{(0.67-x)}Ta_xO_4$$

where $x$ is ½ of 0.67 or less.

The new compounds of the invention have varied uses. The cobalt-containing compounds are useful for coloring glass. For instance, these compounds can be added as a ready source of cobalt oxide colorant. The cobalt compound can be added in powder form in the forehearth of a glass furnace when making any ordinary soda-lime flint glass, for instance, to obtain a blue color, using from 0.05 to 0.2% of the cobalt compound. Similarly, the antimony compounds can be added to a glass batch as a source of antimony oxide as a fining agent, using amounts on the order of 1 to 2 percent of the glass batch. Each of the new compounds of the invention is also useful as refractories in furnaces used to make ferrites by solid-state reactions.

The new compounds disclosed herein are also useful as pigments and fillers for paints in normal paint-making processes. For instance, the following paint formula can be used:

| Ingredient: | Lbs. |
|---|---|
| Compound of invention | 300 |
| Zinc oxide | 25 |
| Long-oil soya alkyd resin (60% nonvolatile) | 480 |
| Mineral spirits | 181 |
| Cobalt naphthenate (6% Co) | 3 |
| Lead naphthenate (24% Pb) | 3 |
| Calcium naphthenate (4% Ca) | 2 |
| Total | 994 |

In addition to the foregoing practical uses, the new compounds disclosed herein are useful in expanding the fund of knowledge in this field. Also, study of these compounds will be helpful to other scientific workers in the fields in suggesting avenues of approach to prepare similar new compounds of a spinel crystalline structure.

As will be evident to those skilled in the art, various modifications of this invention can be made or followed in the light of the foregoing disclosure and discussion without departing from the spirit and scope of the disclosure or from the scope of the claims.

I claim:

1. A new composition in the form of crystals having the formula $$A_{2.33}Sb_{0.67}O_4$$

where $A_{2.33}$ is selected from the group consisting of $$Zn_{(2.33-y)}Mg_y$$
$$Zn_{(2.33-y)}Ni_y$$
$$Co_{(2.33-y)}Mg_y$$

and $$Co_{(2.33-y)}Ni_y$$

where $y$ is any number in the range from 1 to 0.

2. A method of preparing a spinel-type crystalline composition of the formula $$A_{2.33}Sb_{0.67}O_4$$

where $A_{2.33}$ is selected from the group consisting of $$Zn_{(2.33-y)}Mg_y$$
$$Zn_{(2.33-y)}Ni_y$$
$$Co_{(2.33-y)}Mg_y$$

and $$Co_{(2.33-y)}Ni_y$$

where $y$ is any number in the range from 1 to 0, which comprises intimately admixing powders of the oxides of the A metals and of antimony in proportions called for by said formula, pressing said powders into a cohesive shape, and firing said shape in an oxidizing atmosphere at an elevated temperature to effect a solid-state reaction, and thereby forming said spinel-type crystalline composition.

3. A spinel-type crystalline oxide of the formula $$Zn_{2.33}Sb_{0.67}O_4$$

4. A spinel-type crystalline oxide of the formula $$Co_{2.33}Sb_{0.67}O_4$$

5. A spinel-type crystalline oxide of the formula $$Zn_{1.33}Mg_1Sb_{0.67}O_4$$

6. A method of preparing the spinel-type inorganic oxide of the formula $$Co_{2.33}Sb_{0.67}O_4$$

which comprises heating the trirutile-type compound, $CoSb_3O_6$, until the excess antimony oxide is volatilized.

References Cited in the file of this patent

Coffeen: Am. Ceramic. Soc. Jour., vol. 32, No. 1 (Jan. 1949), pages 10 and 11.

Coffeen: Am. Ceramic Soc. Jour., vol 39, No. 4 (April 1956), pages 154 and 155.

Webster's New International Dictionary, Second Edition (unabridge), 1960, pages 548.